Figure 1:
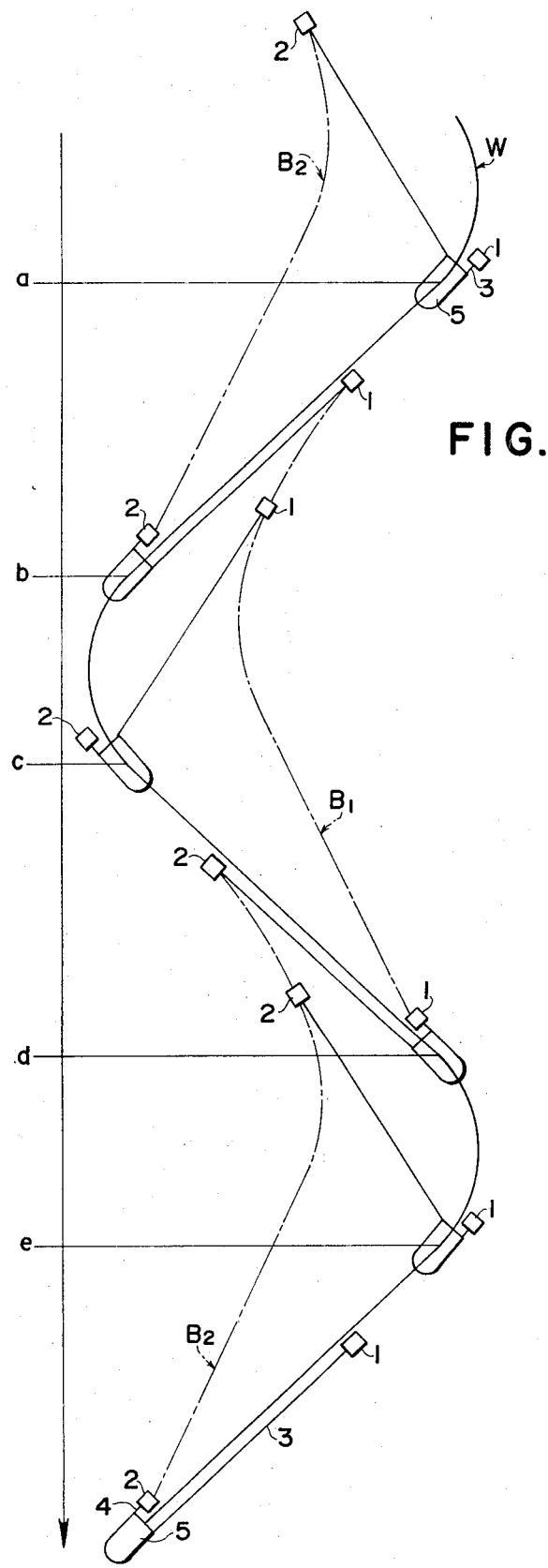

United States Patent [19]
Toritani

[11] 3,777,377
[45] Dec. 11, 1973

[54] METHOD OF COLLECTING SUBMARINE RESOURCES

[76] Inventor: Masatoshi Toritani, 4-26, Naritahigashi 5 chome, Suginami-ku, Tokyo, Japan

[22] Filed: Oct. 27, 1971

[21] Appl. No.: 193,033

[52] U.S. Cl. .................................. 37/195, 37/71
[51] Int. Cl. ............................................. E02f 1/00
[58] Field of Search ................ 37/71, 195; 254/185, 254/190

[56] References Cited
UNITED STATES PATENTS

| 2,648,918 | 8/1953 | Mazzella | 37/71 X |
| 122,529 | 1/1872 | Lotz | 37/71 |
| 364,780 | 6/1887 | Shepard | 37/71 |
| 3,069,141 | 12/1962 | Broussard | 254/185 R |
| 125,023 | 3/1872 | Clarkson | 37/71 |
| 479,296 | 7/1892 | Murray | 254/190 R |

Primary Examiner—Robert E. Pulfrey
Assistant Examiner—Clifford D. Crowder
Attorney—Ernest A. Greenside

[57] ABSTRACT

The method of collecting submarine resources is practised by a collecting vessel provided with a pair of buckets which are adapted to be raised or lowered alternately. The vessel is steered so that a meandering wake is formed, and for every passage of the vessel around the turning point of the meandering wake, one of the buckets is lowered from the vessel toward the bottom of a river or sea and concurrently the other bucket is raised from the bottom to the vessel. While one of the buckets is on the vessel for collection of gathered resources therefrom, the other bucket is dredging through the bottom of the water for accumulating resources therein. The system for carrying out the method is provided with winch means for hoisting the two buckets simultaneously in opposite directions, that is, up and down.

4 Claims, 6 Drawing Figures

METHOD OF COLLECTING SUBMARINE RESOURCES

The invention relates to a method of collecting submarine resources, and more particularly to a method of collecting mineral and other resources present in or on the bottom of relatively deep rivers and seas. The invention also relates to a system which is adapted to carry out the method.

Collection of resources from the bottom of a relatively shallow river or sea may be conducted by drainage and excavation of such area or by the use of known dredging vessel or machines. For an increased depth of water, however, these approaches must fail. It is recognized that there is an abundant supply in or on the bottom of deep water of mineral resources such as manganese or phosphor lime as well as various specimen used in scientific investigations, and there is a high need for collection of such resources.

Conventional technique of collecting resources from the bottom of deep water would be to use a bucket that is lowered by way of rope from a winch on the collecting vessel for the purpose of dredging the bottom. This technique involved a disadvantage that more than one buckets cannot be provided because of the necessity to draw the bucket while navigating the vessel. Specifically, in order to allow the bucket to be lowered and raised from a navigating vessel, the bucket and its associated winch must be located at the stern of the vessel where no space is available which is sufficient to prevent contact of buckets or entanglement of their respective associated ropes from occurring. However, it is evident that the collection technique using a single bucket suffers from a poor efficiency.

Therefore, it is an object of the invention to provide a method which permits a pair of buckets to be lowered alternately from a collecting vessel to the bottom of a river or sea, thereby efficiently collecting resources from the bottom.

It is another object of the invention to provide a system for collecting submarine resources which is simple in arrangement and still allows the above method to be readily carried out.

In accordance with the invention, a collecting vessel is provided with a pair of buckets which are adapted to be operated simultaneously in opposite directions, so that one of the buckets is on the vessel for collection of resources therefrom while the other is dredging the bottom of a river or sea. When switching the operations of these buckets, they are controlled so that on a plan projection, there is a certain angular deviation between the loci of bucket being raised and bucket being lowered, thereby enabling the buckets to operate alternately in order to convey resources from the bottom.

Specifically, the above objects are achieved according to the invention by steering a collecting vessel provided with a pair of concurrently and oppositely operable buckets so as to form a meandering wake, and by initiating the switching of the respective operations of the buckets upon passage of the vessel around the turning point of the wake. In this manner, as viewed in a plan projection, one of the buckets begins its raising motion in a direction generally parallel to a straight portion of the meandering wake which occurs immediately before the turning point, while the other bucket begins its lowering motion in a direction generally parallel to the current straight portion of the wake which the vessel is following during such lowering motion of the bucket. In other words, the raising and lowering motions of these buckets begin with an angular deviation between the directions of respective motions which is nearly equal to the angle formed between two successive straight portions of the meandering wake of the vessel, thereby effectively preventing one of the buckets from coming close to the other bucket during such switching operation.

In the collecting system according to the invention, one or two winches with associated ropes are provided to operate the pair of buckets alternately. Where a winch with a single winding drum is used, the ropes associated with the respective buckets are taken up on the drum in opposite directions. On the other hand, when a pair of winding drums are provided, they may be rotated either in opposite directions or in the same direction with the opposite directions of winding on the respective drums. When using a pair of winches driven from different drive sources, they are preferably interlocked for operation. For the convenience of establishing the necessary rope lengths to reach the bottom and raising both buckets for navigation purpose, it is desirable to have an arrangement not only to raise or lower the pair of buckets alternately, but also to allow respective buckets to be raised independently of the other. The system according to the invention is also provided with rope guide means for raising a bucket from a direction not aligned with the wake of the vessel.

Other objects and features of the invention will be apparent from the detailed description to follow given in connection with an embodiment thereof with reference to the drawings, in which:

FIG. 1 is a schematic view depicting the method of the invention, illustrating an exemplary wake of a vessel and the manner of operating a pair of buckets.

Figure 2:
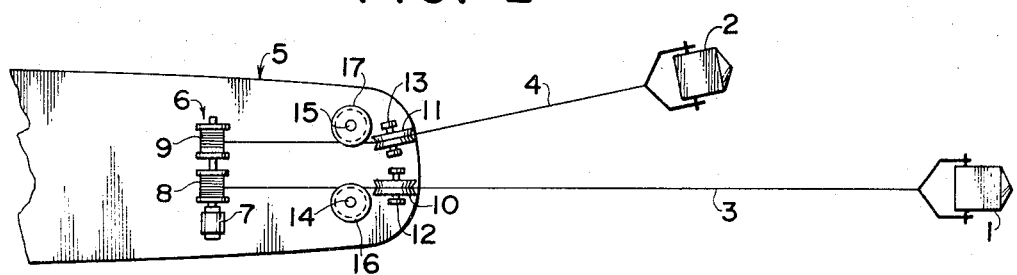
Figure 3A:
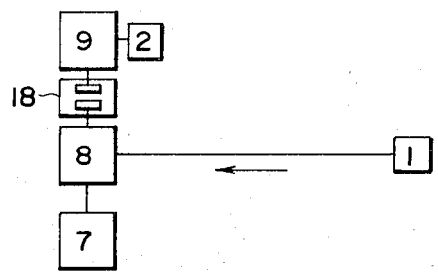
Figure 3B:
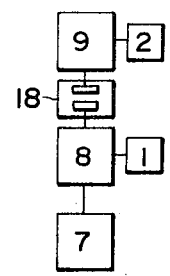
Figure 3C:
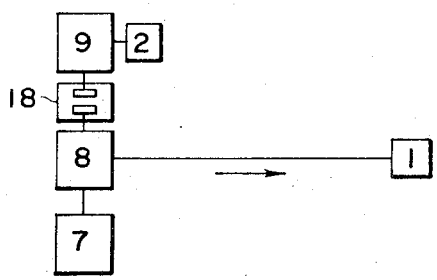
Figure 3D:
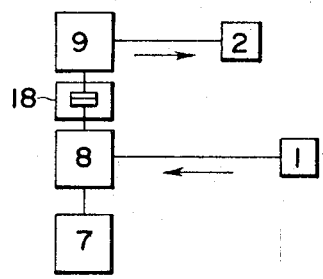

FIG. 2 is a plan view showing an embodiment of the collecting system to carry out the method illustrated in FIG. 1, the vessel being shown only at its stern, and FIGS. 3a to 3d are explanatory views of operation of an improved collecting system, and specifically FIG. 3a illustrates a condition immediately before the end of an operation, FIG. 3b a quiescent condition, FIG. 3c a condition immediately after initiation of an operation, and FIG. 3d a possible position during normal operation.

Referring to FIG. 1, there is shown a meandering wake $w$ of a collecting vessel 5 which is provided with a pair of buckets 1 and 2 each having rope 3 and 4, respectively. In this Figure, the position of the vessel 5 and the buckets 1, 2 is shown along the wake every time the collecting process is switched between the buckets 1 and 2. The corresponding positions of the vessels are designated by $a$, $b$, $c$, $d$ and $e$, each representing a horizontal line extending to the center of the vessel. The loci of the buckets 1 and 2 are shown in chain lines $B_1$ and $B_2$, respectively. At position $a$, the bucket 1 is on the vessel 5, and the bucket 2 is on the bottom of a river or sea, wile at position $b$, the buckets assume interchanged positions. Position $a$ indicates the position along the wake of the vessel 5 at which the switching of the buckets 1 and 2 is initiated. At position $b$, the bucket 1 has reached the bottom, while the bucket 2 has been raised to the vessel 5, and this represents the position for initiating the dredging operation by the bucket 1 until the vessel 5 reaches position $c$ and for initiating collection of resources from the bucket 2 on the vessel. At position c, the dredging operation by the bucket 1 and collection of resources from the bucket 2 both have been completed, and during the interval from position c tition d, the bucket 1 is raised and the bucket 2 is lowered. At position d, the buckets 1 and 2 are interchanged from the condition shown at position b, and therefore during the interval from this position to position e, resources collected by the bucket 1 raised to the vessel 5 is recovered while the bucket 2 is dredging through the bottom of a river or sea. At position e of the vessel, the relative position of the buckets 1 and 2 is quite similar to that shown at position a of the vessel, and hence one cycle of operation is completed. Stated differently, the collecting process for the bucket 1 comprises its lowering in the interval between positions a and b, dredging operation in the interval between positions b and c, raising in the interval between positions c and d, and collection in the interval between positions d and e. The collecting process for the bucket 2 is just reverse to that for the bucket 1; that is to say, the bucket 2 is being raised while the bucket is being lowered, and the bucket 2 is on the vessel 5 for collection of resources therefrom while the bucket 1 is dredging for collecting submarine resources. It should be understood that while the collecting process for the bucket 1 has been described as including a dredging step which ranges only for the interval from position b to c, the dredging may extend into the interval between positions a and b depending principally on the lowering speed of the bucket 1.

In accordance with the invention, the steering of the vessel 5 is controlled in connection with the collecting processes of the buckets 1 and 2, and the result is a meandering wake depicted by the vessel 5. In the example shown in FIG. 1, the vessel navigates along substantially linear paths between positions a and b and between positions c and d, and navigates along oppositely curved paths between positions b and c and positions d and e. As a result, at position c or e where raising and lowering of the bucket 1 or 2 take place, respectively, there can be provided an angular deviation, as viewed in plan projection, between the direction in which one bucket is lowered and the direction in which the other is raised which is nearly equal to the angle formed between an immediately adjacent pair of substantially straight portions of the meandering wake of the vessel. Though this angular deviation decreases as the vessel 5 advances toward position d or b (assuming that the vessel 5 starting from position e travels toward position b in a cycle manner) where raising and lowering of the buckets 1 and 2 end, nevertheless it is assured that a sufficient angular deviation is maintained to prevent the buckets or ropes associated with the buckets 1 and 2 from coming close to each other. As the vessel 5 comes close to positions d and b, the both buckets are spaced far enough to prevent contact therebetween. In this manner, any interference between a bucket being raised and a bucket being lowered or between their associated ropes can be effectively voided. While it is most desirable for securing interference-free operation of the both buckets to initiate the lowering and raising of the buckets 1 and 2 immediately after the vessel 5 has passed the turning point of the meandering wake as illustrated in FIG. 1, it is possible to initiate such lowering and raising during passage of the vessel 5 through the curved turning area or even at a certain distance from the turning point after passage therethrough, without causing interference between the buckets or their ropes. Therefore, it should be understood that the operation shown in FIG. 1, is merely illustrative of, but not to be construed as limiting the invention. Similarly, the positions at which lowering and raising are completed may be displaced from positions d and b depending upon various factors including the depth of water and the speed of the vessel. Hence, positions d and b as such are illustrative only.

FIG. 2 schematically shows the stern of a collecting vessel 5. A winch 6 is provided on the vessel to allow manipulation of the buckets 1 and 2 by way of their associated ropes 3 and 4. The winch 6 comprises a pair of winding drums 8 and 9 directly coupled with a drive source 7. The ropes 3 and 4 are wound on the respective winding drums 8 and 9 in opposite directions so that when one of the ropes is extended for its maximum length, the other rope has the minimum free length. A pair of guide pulleys 10 and 11 for the ropes 3 and 4 are provided on horizontal shafts 12 and 13 which are mounted to be freely rotatable in a horizontal plane. Thus, the guide pulleys 10 and 11 are adapted to receive ropes extending in a direction other than lengthwise of the vessel 5, whereby the winch 6 can take up the ropes 3 and 4 from any direction. In certain instances, it may be desirable to provide intermediate the pulleys 10, 11 and the winch 6 a pair of shaft 14 and 15 which extend in a direction, such as in a vertical direction, for example, different from the direction of the shafts 12 and 13 for carrying auxiliary guide pulleys 16 and 17, respectively, to prevent disengagement of the ropes 3 and 4 from the guide pulleys 10 and 11.

Buckets 1 and 2 may be any of known varieties which are suitable for the purpose of collecting resources.

In the collecting system shown in FIG. 2, the winch 6 comprises the pair of winding drums 8 and 9 which are connected together and on which the ropes 3 and 4 associated with the buckets 1 and 2 are wound in opposite directions. This prevents one of the buckets 1, 2 from being operated alone. While this arrangement may be useable for a long term collecting operation in a limited area where the depth of water is substantially constant throughout, it is desirable to have capability to vary the distance between the vessel and one of the buckets when the other bucket is raised up to the vessel or to raise both of the buckets simultaneously. According to the invention, it is also possible to construct a system which permits navigation of the vessel 5 from one area to another with both of the buckets 1 and 2 wound up and which allows collection of submarine resources from the bottom of varying depth.

FIG. 3 shows an improved collecting system of the invention in a simplified schematic form. In this system, the winch 6 comprises a single drive source 7 and a pair of winding drums as before, and while one of the drums, 8, is directly connecting with the drive source 7, the other drum 9 is connected with the drive source 7 through a coupling 18, thus permitting one drum 8 to be rotated independently from the other drum 9. The ropes 3 and 4 associated with the buckets 1 and 2 are wound on the drums 8 and 9, respectively, in opposite directions as in the system of FIG. 2. In the improved collecting system, it is possible to establish the required length of the ropes for the buckets 1 and 2 to reach the bottom of a river and sea before starting the operation, and the vessel 5 can navigate with both of the buckets 1 and 2 raised up to the vessel. The system operates as follows:

FIG. 3a shows the condition of the ropes immediately before the end of an operation. At this time, one of the buckets, 2, is on the vessel 5 by taking up its associated rope 4 on the winding drum 9, and the other bucket 1 is on the bottom of the water. In order to avoid lowering of the bucket 2 upon raising the bucket 1 which would occur in the previous embodiment, the coupling 18 of this system is deactuated when it is desired to end an operation, whereby only the winding drum 8 can be rotated without causing a rotation of the other drum 8. In this way, both of the buckets 1 and 2 can be raised as shown in FIG. 3b. In this position of the buckets, the vessel 5 can be navigated to a remote area or the buckets can be protected from being washed away by tides during an inoperative period such as nighttime.

When re-starting an operation, the coupling 18 is left in its deactuated condition as shown in FIG. 3c, and the winding drum 8 is driven along in a direction opposite to that in which it was driven in FIG. 3a, thereby drawing out the rope 3 and lowering the bucket 1 until it reaches the bottom. A full length of the rope 3 taken up on the winding drum 8 or a part thereof may be drawn out at this end, and thus the necessary length of the rope 3 for the bucket 1 to reach the bottom of the water can be established every time the operation is re-started. When the bucket has reached the bottom, the coupling 18 is actuated to connect the winding drum 9 with the drive source 7, and subsequently the buckets 1 and 2 can be operated alternately. It will be appreciated that the rope 4 for the bucket 2 is drawn out for the same length as the rope 3. FIG. 3d shows a condition during the normal operation, which takes place quite similarly as in the system of FIG. 2.

What is claimed is:

1. The method of collecting submarine resources comprising the steps of providing a collecting vessel with a pair of collecting buckets adapted to be raised or lowered alternately; steering said vessel so as to form a meandering wake; lowering one of said buckets and concurrently raising the other bucket upon every passage of the vessel around a turning point in the meandering wake whereby said buckets alternately dredge through the bottom of the water; recovering resources collected by said buckets by their dredging through the bottom of the water as they are raised up to the vessel alternately.

2. Method of collecting submarine resources according to claim 1, in which the step of lowering said one of said buckets and raising said other of said buckets is initiated during passage of the vessel through a curved turning portion in the meandering wake.

3. Method of collecting submarine resources according to claim 1, in which the step of lowering said one of said buckets and raising said other of said buckets is initiated after passage of the vessel through a curved turning portion in the meandering wake.

4. Method of collecting submarine resources according to claim 1, in which the step of lowering said one of said buckets and raising said other of said buckets is initiated immediately after passage of the vessel through a curved turning portion in the meandering wake, the lowering and raising of the buckets being completed before the vessel reaches the next following curved turning portion in the meandering wake, and during the time that the vessel passes through the next curved turning portion in the meandering wake, said one of said buckets dredges through the bottom of the water while resources collected by said other of said buckets is recovered in the vessel.

* * * * *